United States Patent [19]

Kubo

[11] Patent Number: 5,566,102

[45] Date of Patent: Oct. 15, 1996

[54] ARITHMETIC ELEMENT COUPLING NETWORK

[75] Inventor: Shun-ichi Kubo, Tokyo, Japan

[73] Assignee: Kabushiki Kaisha Toshiba, Kawasaki, Japan

[21] Appl. No.: 260,384

[22] Filed: Jun. 14, 1994

[30] Foreign Application Priority Data

Jun. 14, 1993 [JP] Japan .................................. 5-142060

[51] Int. Cl.$^6$ ................................................ G06F 7/38
[52] U.S. Cl. ................................................ 364/736
[58] Field of Search .................................... 364/736, 724

[56] References Cited

U.S. PATENT DOCUMENTS 4,811,260  3/1989  Abe et al. ........................ 364/724.01
5,130,942  7/1992  Enari ............................... 364/724.01

OTHER PUBLICATIONS

Transaction of the American Society, "On The Structure Of Continuous Functions Of Several Variables" D. A. Spreecher; 115, pp. 340–355; 1965.

Primary Examiner—Tan V. Mai
Attorney, Agent, or Firm—Oblon, Spivak, McClelland, Maier, & Neustadt, P.C.

[57] ABSTRACT

An arithmetic element coupling network for inputting at least one signal to obtain a desired output includes a plurality of arithmetic elements including at least one of a first arithmetic element for receiving one signal and performing different types of first arithmetic operations of the one signal, a second arithmetic element for receiving a plurality of signals and performing identical second arithmetic operations of the plurality of signals, and a third arithmetic element for receiving a plurality of signals and performing different types of third arithmetic operations of each of the plurality of signals, and a weighting means for arbitrarily coupling the plurality of arithmetic elements and supplying a value multiplying a predetermined weight coefficient with one of output values from two arithmetic elements coupled to each other to the other arithmetic element.

20 Claims, 5 Drawing Sheets

ARITHMETIC ELEMENT COUPLING NETWORK

BACKGROUND OF THE INVENTION

1. Field of the Invention

The present invention relates to an arithmetic element coupling network.

2. Description of the Related Art

In recent years, a neural network has received much attention as an apparatus for learning and approximating desired input/output functions required in pattern recognition and control, an association memory, or means for obtaining approximated solutions for optimization problems at high speed.

Learning here means optimization of each parameter in an arithmetic element coupling network so as to cause a neural network having neuron elements coupled in predetermined input/output relationships to realize a desired input/output relationship. For example, as a general learning technique in a neural network, coupling coefficients between all the neuron elements are changed to minimize the square sum of errors between an actual output from the arithmetic element coupling network and a desired output with respect to a specific input supplied as learning data. By repeating this learning, the input/output relationship of the neural network comes close to the desired input/output relationship. As a result, the neural network can play a role as a function approximation apparatus.

According to a general conventional technique, when a neural network is applied as an association memory or means for obtaining approximated solutions for optimization problems, evaluation functions defined by these problems are embedded in an arithmetic element coupling network structure using neuron elements having monotone increasing input/output characteristics. State transition rules for monotonously decreasing the function values are supplied every time the state of the neuron element changes, thereby obtaining minimum solutions of the evaluation functions.

(1) To calculate an output from a neural network in response to one input information, a plurality of arithmetic operations using input/output functions of the neuron elements must be performed. To conventionally realize these using arithmetic elements, the number of arithmetic elements is set equal to the number of arithmetic operations. This indicates redundancy in circuit, resulting in a disadvantage in hardware design.

When an input/output relationship to be realized is complicated or approximation precision is to be improved, the number of neuron elements required for finally realizing a desired input/output relationship inevitably increases, thus posing a problem on hardware design.

(2) When an input/output relationship to be realized is complicated or approximation precision is to be improved, the number of neuron elements constituting an intermediate layer required for finally realizing a desired input/output relationship inevitably increases. Along with this increase, the number of coupling weighting coefficients between the neuron elements is known to greatly increase.

This leads to an increase in memory capacity for holding weighting coefficient values, an increase in the number of signal lines for changing these values during learning, and an increase in the number of multipliers for calculating the products of outputs from the neuron elements. In addition, an increase in calculation amount caused by changes during learning undesirably causes an increase in learning time.

(3) In any application of a neural network as a function approximation apparatus, an association memory, or means for solving optimization problems, a portion corresponding to the neuron element is constituted by a single arithmetic element such as a differential amplifier, and its input/output characteristic is defined by the electrical characteristics of the arithmetic element. For example, when a known sigmoid function which can be realized by a differential amplifier is used as an input/output function, this function has been theoretically and experimentally proved to provide effective solutions for many problems.

In a neural network for realizing desired input/output characteristics, however, unlike in the conventional case, the input/output characteristic of each neuron element need not be uniquely defined. This characteristic can be selected depending on problems to be solved by the neural network, and an improvement in the capability of the arithmetic element coupling network as a whole can be expected. Demand has arisen for flexibly changing an input/output characteristic.

Figure 1:
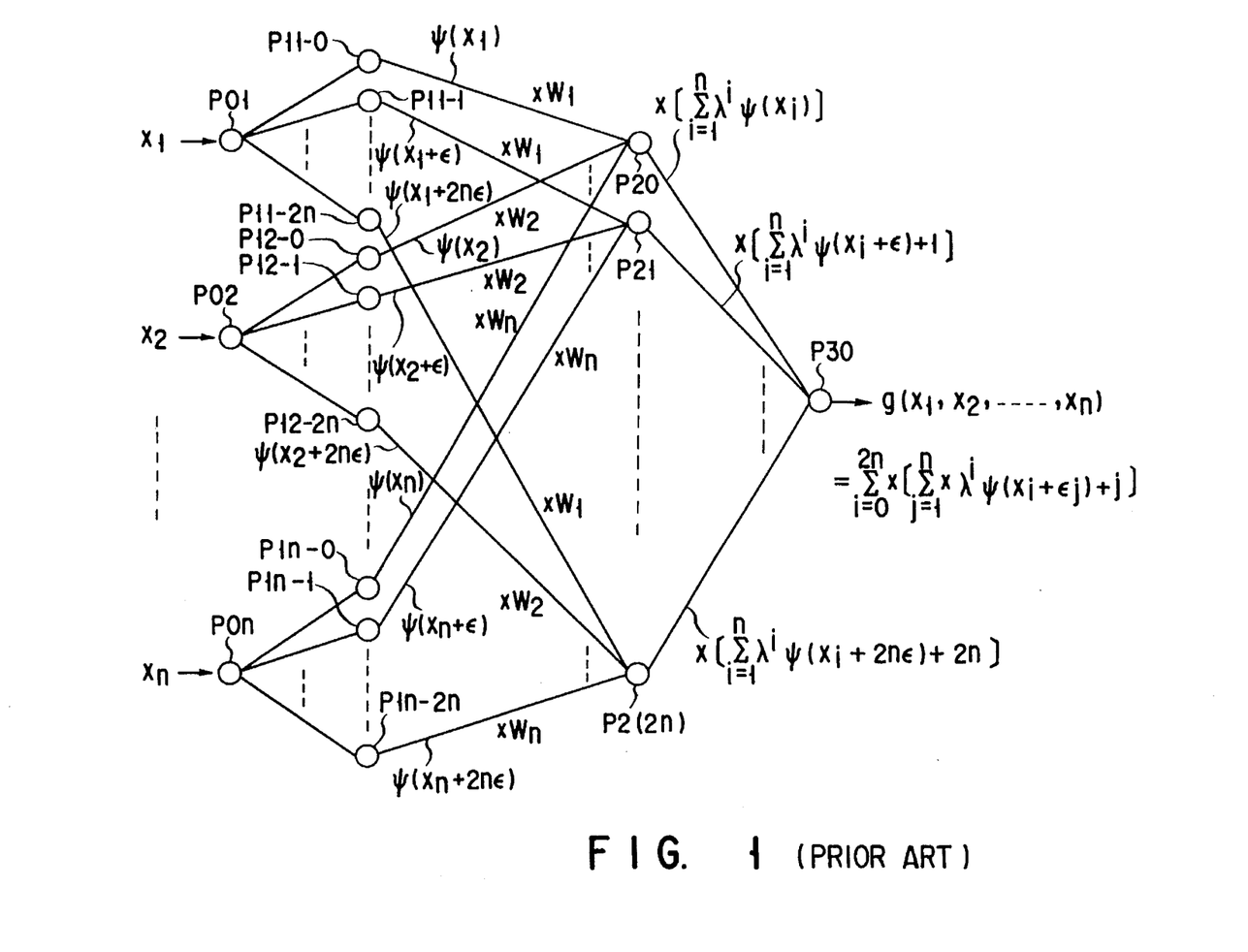
FIG. 1 is a view showing the arrangement of a conventional arithmetic element coupling network.

For example, in a neural network (Sprecher, D. A., "On the structure of continuous functions of several variables", Transaction of the American Mathematical Society, 115, 340–355 (1965) as shown in FIG. 1, an arbitrary multivariable continuous function using variables $x_1$ to $x_n$ is known to be expressed upon selecting a specific continuous function $\chi$, a monotone increasing continuous function $\phi$, a real constant $w_i$, and a positive constant $\epsilon$. To cause this neural network to learn and approximate a desired input/output function relationship, the continuous function $\chi$ and the monotone increasing continuous function $\phi$ which correspond to the input/output function of the neuron element must be learned. It is, however, very difficult to learn these functions. For this reason, demand has arisen for confirming the number of parameters to be learned (i.e., limiting the number of parameters) in such a neural network to facilitate learning.

As described above, first, in a conventional neural network, i.e., an arithmetic element coupling network, the neuron elements having the same input/output relationship are arranged as all independent arithmetic elements. When an input/output relationship to be realized is complicated, or approximation precision is to be improved, the number of necessary arithmetic elements inevitably increases, thus posing a problem on hardware design.

Second, in a conventional arithmetic element coupling network, when an input/output relationship to be realized is complicated or approximation precision is to be improved, the number of neuron elements constituting an intermediate layer required for finally realizing a desired input/output relationship inevitably increases. Along with this increase, the number of coupling weighting coefficients between the neuron elements greatly increases. In addition, a long learning time is required.

Third, in a neural network for realizing desired input/output characteristics, these characteristics must be flexibly selected depending on problems to be solved by the neural network.

On the other hand, in an arithmetic element coupling network requiring learning of a predetermined input/output function itself of the arithmetic element, it is very difficult to learn this function. For this reason, demand has arisen for limiting the number of parameters to be learned to facilitate learning.

SUMMARY OF THE INVENTION

It is an object of the present invention to provide an improved arithmetic element coupling network.

More specifically, it is an object of the present invention to provide:

(1) an arithmetic element coupling network capable of realizing a desired input/output relationship using a small number of arithmetic elements;

(2) an arithmetic element coupling network in which a memory capacity required for holding weighting coefficient values is reduced, the number of signal lines for changing these values during learning and a calculation amount caused by changes during learning can be reduced, and the number of multipliers for calculating the products of outputs from the arithmetic elements is reduced; and (3) an arithmetic element coupling network for learning input/output characteristics of neuron elements, capable of limiting the number of parameters to be learned, flexibly changing input/output characteristics, and improving the approximation capability of the arithmetic element coupling network as a whole.

An arithmetic element coupling network for inputting at least one signal to obtain a desired output according to the first aspect of the present invention is characterized by comprising: a plurality of arithmetic elements including at least one of a first arithmetic element for receiving one signal and performing different types of first arithmetic operations of the one signal, a second arithmetic element for receiving a plurality of signals and performing identical second arithmetic operations of the plurality of signals, and a third arithmetic element for receiving a plurality of signals and performing different types of third arithmetic operations of each of the plurality of signals; and weighting means for arbitrarily coupling the plurality of arithmetic elements and supplying a value multiplying a predetermined weight coefficient with one of output values from two arithmetic elements coupled to each other to the other arithmetic element.

The first arithmetic operation element preferably includes a plurality of arithmetic elements and supplies an output to one arithmetic element for performing a predetermined arithmetic operation, the weighting means includes means for multiplying a weighting coefficient corresponding to an output from each of the first arithmetic elements.

The first arithmetic element preferably includes means for receiving a value obtained by adding a predetermined value as an offset value which is an arbitrary integer multiple of the input and for performing a predetermined arithmetic operation while the offset value is changed.

The network according to the first aspect further comprises a fourth arithmetic element for outputting a predetermined signal to the second arithmetic element, and the second arithmetic element includes a plurality of arithmetic elements and supplies an output to one arithmetic element for performing a predetermined arithmetic operation, and the weighting means includes means for multiplying a weighting coefficient corresponding to the fourth arithmetic element with an output from the second arithmetic element.

The network according to the first aspect further comprises a fourth arithmetic element for outputting a predetermined signal to the third arithmetic element, and the third arithmetic element supplies an output to one arithmetic element for performing a predetermined arithmetic operation and the weighting means includes means for multiplying a weighting coefficient corresponding to the fourth arithmetic element with an output from the third arithmetic operation element.

The third arithmetic element includes means for receiving a value obtained by adding a predetermined value as an offset value which is an arbitrary integer multiple of the input and for performing a predetermined arithmetic operation while the offset value is changed.

According to the arithmetic element coupling network of the first aspect of the present invention, one arithmetic element time-divisionally performs a plurality of arithmetic operations and sequentially outputs the resultant output values as time-series data.

The total number of arithmetic elements constituting the arithmetic element coupling network can be greatly reduced while the capability for approximating a desired input/output function is maintained because a plurality of conventional arithmetic elements can be arranged as one arithmetic element.

An arithmetic element coupling network for inputting at least one signal to obtain a desired output according to the second aspect of the present invention is characterized in that the weighting means has a predetermined function of calculating weighting coefficients in accordance with parameters smaller in number than the weighting coefficients in the first aspect.

The weighting means includes means for adjusting the parameters by learning or means for setting at least two weighting coefficients to be equal values.

According to the arithmetic element coupling network of the second aspect of the present invention, a necessary memory capacity for holding the weighting coefficient values, the number of signal lines for changing these values during learning, and the calculation amount caused by changes during learning can be greatly reduced because all the weighting coefficient values between the arithmetic elements can be generated using a function consisting of the number of parameters smaller than that of the weighting coefficient values. Therefore, the learning time can be shortened.

In addition, when a plurality of coupling relations having the same weighting coefficient are present between the arithmetic elements, the number of multipliers for calculating the product of outputs from the arithmetic elements can also be greatly reduced.

An arithmetic element coupling network according to the third aspect of the present invention is characterized by including a plurality of arithmetic elements for performing at least one predetermined arithmetic operation of at least one input signal and outputting at least one output signal, and means for arbitrarily coupling the plurality of arithmetic elements and supplying a value multiplying a predetermined weight coefficient with one of output values from two arithmetic elements coupled to each other to the other arithmetic element, wherein at least one of the plurality of arithmetic operation elements includes at least one unit arithmetic element selected from, a plurality of multi-input, one-output arithmetic elements which are weighted and linearly coupled, a plurality of one-input, one-output arithmetic elements which are weighted and linearly coupled, and a plurality of one-input, multi-output arithmetic elements which are weighted and linearly coupled.

In the above solving means, the following arrangement may also be employed:

(i) in the arithmetic element coupling network, a function representing the input/output function of each of plurality of arithmetic elements, which is present on the same level, does not have any lower hierarchical structure, and constitutes an identical arithmetic element having one higher level than that of each of the plurality of arithmetic elements may be:

multi-variable functions each having a plurality of variables obtained such that constants are respectively added to these variables, the resultant sums are linearly converted to obtain new variables as a set of new variables, and function values obtained by arithmetically operating the set of new variables in accordance with the multi-variable function are multiplied with a constant, thereby converting the products into a function identical to the specific function; or one-variable functions each having one variable obtained such that a constant is added to this variable, the resultant sum is multiplied with a constant to obtain a new variable, a function value obtained by arithmetically operating the new variable in accordance with the one-variable function is multiplied with a constant, thereby converting the product into a function identical to the specific function, or (ii) in the arithmetic element coupling network, a function representing the input/output function of each of all arithmetic elements having no lower hierarchical structure may be:

multi-variable functions each having a plurality of variables obtained such that constants are respectively added to these variables, the resultant sums are linearly converted to obtain new variables as a set of new variables, and function values obtained by arithmetically operating the set of new variables in accordance with the multi-variable function are multiplied with a constant, thereby converting the products into a function identical to the specific function; or one-variable functions each having one variable obtained such that a constant is added to this variable, the resultant sum is multiplied with a constant to obtain a new variable, a function value obtained by arithmetically operating the new variable in accordance with the one-variable function is multiplied with a constant, thereby converting the product into a function identical to the specific function.

Cases (i) and (ii) may have the following arrangements:

(iii) in the arithmetic element coupling network, all or some of arithmetic elements having a hierarchical structure are arithmetic elements each for generating one output value in response to one input signal or a sum of at least two input signals, and the predetermined input/output relationship for determining the output in response to one input signal or the sum of at least two input signals to each of at least some of the arithmetic elements may be a hierarchical relationship using one-input, one-output elements having a plurality of predetermined input/output relationships, or a relationship obtained by finitely repeating this hierarchical structure, or (iv) in the arithmetic element coupling network, at least some of the arithmetic elements having a hierarchical structure are arithmetic elements defined such that all output values are function values of one input signal of at least one input signal, and the one-input, one-output predetermined relationship of at least some of the arithmetic elements may be a hierarchical relationship using one-input, one-output elements having a plurality of predetermined input/output relationships, or a relationship obtained by finitely repeating this hierarchical structure.

Case (ii) may have the following arrangement.

(v) in the arithmetic element coupling network, all arithmetic elements having no lower hierarchical structure are arithmetic elements for outputting one output value in response to one input signal or a sum of two or more input signals in accordance with a predetermined input/output relationship, and the predetermined input/output relationship for determining the output from the arithmetic element in response to one input signal or the sum of two or more input signals may be one-variable functions each having one variable obtained such that a constant is added to this variable, the resultant sum is multiplied with a constant to obtain a new variable, and a function value obtained by arithmetically operating the new variable in accordance with the one-variable function is multiplied with a constant, thereby converting the product into a function identical to the specific function.

Cases (i), (ii), (iii), (iv), and (v) may be arranged as follows:

(vi) the one-variable function expressing the predetermined input/output relationship is an arbitrary function of one-variable functions each having one variable obtained such that a constant is added to this variable, the resultant sum is multiplied with a constant to obtain a new variable, and a function value obtained by arithmetically operating the new variable in accordance with the one-variable function is multiplied with a constant, thereby converting the product into a function identical to $(1+\exp(-x))^{-1}$; and (vii) the one-variable function expressing the predetermined input/output relationship is an arbitrary function of one-variable functions each having one variable obtained such that a constant is added to this variable, the resultant sum is multiplied with a constant to obtain a new variable, and a function value obtained by arithmetically operating the new variable in accordance with the one-variable function is multiplied with a constant, thereby converting the product into a function identical to $\exp(-x^2)$.

Alternatively, case (i) or (ii) may be arranged as follows:

(viii) the multi-variable function expressing the predetermined input/output relationship is one of multi-variable functions each having a plurality of variables obtained such that constants are respectively added to these variables, the resultant sums are linearly converted to obtain new variables as a set of new variables, and function values obtained by arithmetically operating the set of new variables in accordance with the multi-variable function are multiplied with a constant, thereby converting the products into a function identical to a function expressed as follows:

$$\prod_{i=1}^{N} \exp(-x_i^2) \qquad (1)$$

The arithmetic element coupling network of the third aspect of the present invention employs a hierarchical structure obtained such that at least one arithmetic element in the arithmetic element coupling network is coupled to arithmetic elements having a plurality of predetermined input/output characteristics. That is, according to the arithmetic element coupling network of the third aspect of the present invention, a circuit obtained by coupling the arithmetic elements having the plurality of predetermined input/output characteristics operates as one arithmetic element having one higher level than that of the arithmetic elements having the plurality of predetermined input/output characteristics.

The input/output characteristics of the arithmetic element of a higher level can be flexibly changed using existing elements with a small number of parameters, thereby improving the capability of the neural network as a whole.

When the input/output characteristic of an arithmetic element is unknown, and they are to be learned, the number of parameters to be learned can be limited to facilitate learning.

Additional objects and advantages of the present invention will be set forth in the description which follows, and in part will be obvious from the description, or may be learned by practice of the present invention. The objects and advantages of the present invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the present invention and, together with the general description given above and the detailed description of the preferred embodiments given below, serve to explain the principles of the present invention in which.

DETAILED DESCRIPTION OF THE PREFERRED EMBODIMENTS

The preferred embodiments of the present invention will be described with reference to the accompanying drawings.

An arithmetic element coupling network according to the first embodiment of the present invention will be described with reference to FIG. 2.

According to the present invention, a desired arithmetic element coupling network is constituted by a smaller number of arithmetic elements. An arithmetic element coupling network, using a smaller number of arithmetic elements, which can provide the same input/output characteristics as those of the conventional arithmetic element coupling network shown in FIG. 1 will be described below. FIG. 2 is a view showing the arrangement of this arithmetic element coupling network.

The input/output characteristics of the arithmetic element coupling network in FIG. 1, which are to be provided by the arithmetic element coupling network in FIG. 2, will be described below.

The conventional arithmetic element coupling network in FIG. 1 comprises input elements P01 to P0n for receiving n input signals $x_1$ to $x_n$ and generating 2n+1 outputs, n·(2n+1) first intermediate layer arithmetic elements P11-0 to P11-2n, p12-0 to P12-2n, . . . , P1n-0 to P1n-2n connected to the outputs of the input elements P01 to P0n, multipliers (not shown), respectively connected to the outputs of the first intermediate layer arithmetic elements, for multiplying inputs with weighting coefficients, 2n+1 second intermediate layer arithmetic elements P20 to P2(2n) connected to the first intermediate layer arithmetic elements through the multipliers, and an output element P30 for outputting a sum of all the inputs from the second intermediate layer arithmetic elements.

Each first intermediate layer arithmetic element P1i-j (i=1 to n, j=0 to 2n) is an element whose input/output characteristic is expressed as $\phi(x+\epsilon \cdot j)$. An output from each first intermediate layer arithmetic element P1i-j is raised to the ith power of the parameter $\lambda$ by the corresponding multiplier (not shown). An output from each multiplier is input to the second intermediate layer arithmetic elements P2j. Each second intermediate layer arithmetic element P2j is an element for receiving the outputs from all the first intermediate layer arithmetic elements and outputs an arithmetic result of an input/output characteristic $\chi(X+j)$ with respect to the sum of the outputs. A final output signal obtained through the arithmetic process described above is expressed as follows with respect to the input signals $x_1$ to $x_n$:

$$\sum_{j=0}^{2n} \chi \left[ \sum_{i=1}^{n} \lambda^i \phi(x_i + \epsilon \cdot j) + j \right] \quad (2)$$

In this expressional form, an arbitrary multi-variable continuous function having $x_1$ to $x_n$ as variables can be expressed, as is known well, if a specific continuous function $\chi$, a monotone increasing continuous function $\phi$, a real constant $\lambda$, and a positive constant $\epsilon$ are selected. In the arithmetic element coupling network in FIG. 1, the required numbers of first and second intermediate layer arithmetic elements are n·(2n+1) and 2n+1, respectively.

The arithmetic element coupling network according to the first embodiment of the present invention in FIG. 2 will be described below.

The arithmetic element coupling network according to the first embodiment comprises input elements A01 to A0n for directly outputting input signals $x_1$ to $x_n$, n first intermediate layer arithmetic elements A11 to A1n (to be represented as A1i) respectively connected to the outputs of the input elements, n multipliers (not shown) respectively connected to the outputs of the first intermediate layer arithmetic elements, a second intermediate layer arithmetic element A20 connected to the first intermediate layer arithmetic elements through the multipliers, an output element A30 connected to the output of the second intermediate layer arithmetic element A20, and an output element A40 for supplying an output (to be described later) to the second intermediate layer arithmetic element A30.

The first intermediate layer arithmetic elements Ali are time-divisional arithmetic elements for sequentially outputting 2n+1 time-series output values $\phi(x_i+\epsilon \cdot j)$ (j=0, . . . , 2n) in response to inputs $x_i$(i=1, . . . , n). The j values of the first intermediate layer arithmetic elements A11 to A1n coincide with each other at each time.

The output element A40 synchronizes the first intermediate layer arithmetic elements A11 to A1n and outputs the j values.

The second intermediate layer arithmetic element A20 outputs the arithmetic result of an input/output characteristic $\chi$ (X) with respect to a sum X of all the inputs at each time.

The output element A30 adds time-series data input from the second intermediate layer arithmetic elements by (2n+1) times and outputs the sum.

The multipliers (not shown) multiply the outputs from the intermediate layer arithmetic elements A1i with weighting coefficients $w_i$.

Figure 2:
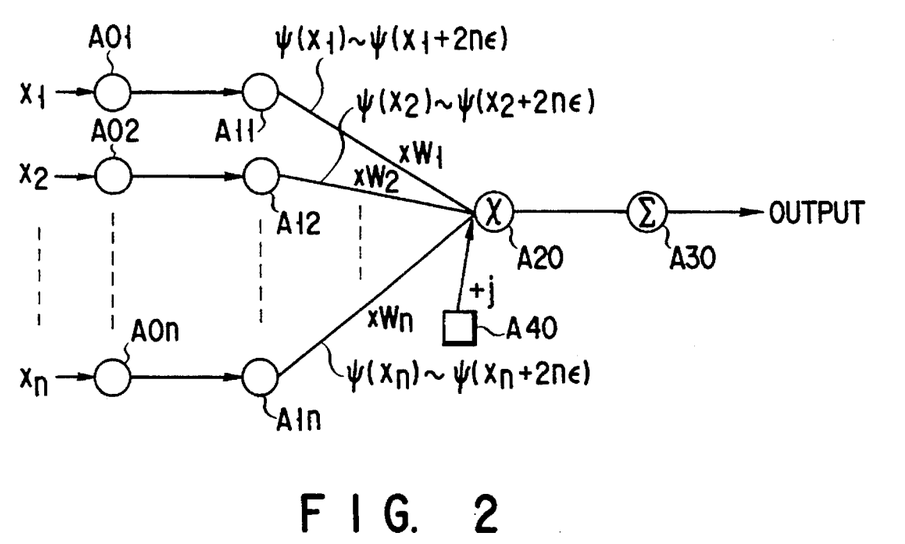
FIG. 2 is a view showing the arrangement of an arithmetic element coupling network according to the first embodiment of the present invention.

Symbols $w_1$ to $w_n$ indicated together with a multiplication operator x along the lines connecting the first and second intermediate layer arithmetic elements in FIG. 2 indicate the weighting coefficient values multiplied by the multipliers. In the following drawings, a symbol represented together with a multiplication operator x along a line connecting one element to another element represents a weighting coefficient value multiplied by a multiplier (not shown).

The operation of the arithmetic element coupling network according to the first embodiment will be described below.

The values $\phi(x_i+\epsilon \cdot j)$ are simultaneously output from the first intermediate layer arithmetic elements A1i for j=0. These outputs are multiplied with the weighting coefficients $w_i$ by the corresponding multipliers to obtain products $w_i \cdot \phi(x_i+\epsilon \cdot j)$, which are then supplied to the second intermediate layer arithmetic element A20. In synchronism with this, the output value j is supplied from the output element A40 to the second intermediate layer arithmetic element A20.

The second intermediate layer arithmetic element A20 receives all the input signals, calculates $\chi$ (x) using the sum of all the input signals as an input x, and outputs $\chi$ (x) to the output terminal A30.

The above operation is repeated from j=1 to j=2n.

The output element A30 time-divisionally receives 2n+1 outputs corresponding to j=0 to j=2n from the second intermediate layer arithmetic element A20. The output element A30 receives the 2n=1 outputs and outputs the sum.

By the above operations, the same result as in the conventional arithmetic element coupling network in FIG. 1 can be obtained. When the time-divisional arithmetic element is used as in the first embodiment, the number of arithmetic elements can be efficiently reduced. When the arithmetic element coupling network in FIG. 1 is compared with that of the first embodiment, the number of first intermediate layer arithmetic elements can be reduced from n·(2n+1) to n, and the number of second intermediate layer arithmetic elements can be reduced from 2n+1 to one while a desired input/output relationship is maintained in the arithmetic element coupling network. In addition, the number of multipliers for multiplying the weighting coefficient values with the outputs from the first intermediate layer arithmetic elements can be reduced from n·(2n+1) to n.

In addition, after variables obtained by adding the input values to numerical values $\epsilon \cdot j$, the plurality of operations executed by the time-divisional arithmetic elements used in the first embodiment are repeated, thereby realizing these operations using a simple circuit.

Referring to FIG. 2, the input elements A01 to A0n arranged to match the arrangement in FIG. 1 directly output input signals, and are omitted in practice.

In the description of the first embodiment, the present invention has been applied to the arithmetic element coupling network in FIG. 1. However, the present invention can be equally applied to other general arithmetic element coupling networks.

An arithmetic element coupling network according to the second embodiment of the present invention will be described below.

Figure 3:
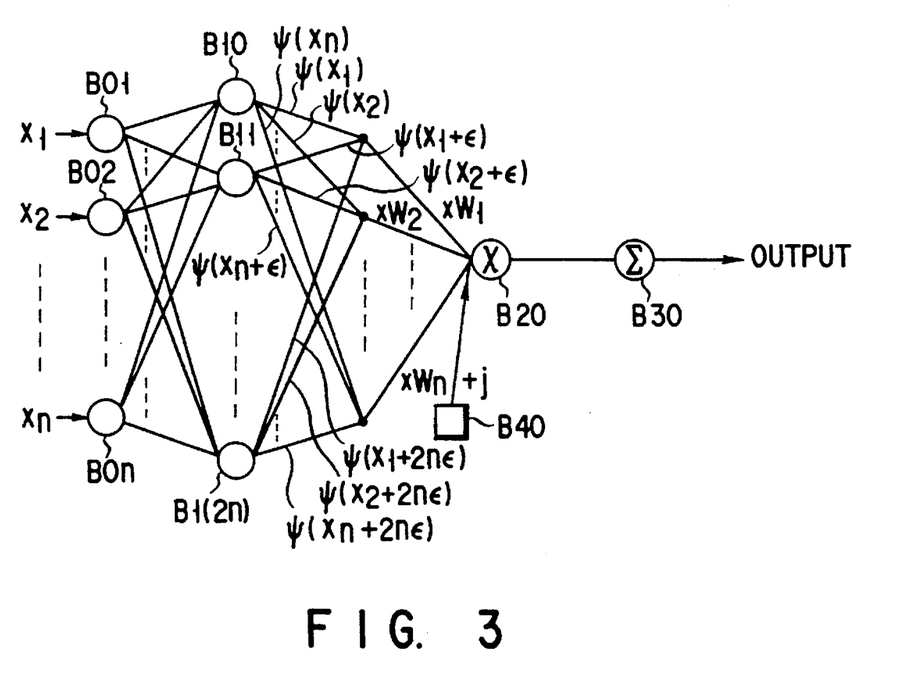
FIG. 3 is a view showing the arrangement of an arithmetic element coupling network according to the second embodiment of the present invention.

FIG. 3 is a view showing the arithmetic element coupling network according to this embodiment. This arithmetic element coupling network comprises input elements B01 to B0n, 2n+1 first intermediate layer arithmetic elements B10 to B1(2n), multipliers (not shown), a second intermediate layer arithmetic element B20, an output element B30, and an output element B40.

The input elements B01 to B0n output 2n+1 data without modifying input signals $x_1$ to $x_n$.

Each first intermediate layer arithmetic element B1j (j=0, ..., 2n) receives inputs $x_i$ (i=1 to n) and outputs output values $\phi(x_i+\epsilon \cdot j)$ respectively corresponding to the inputs $x_i$. In this embodiment, the first intermediate layer arithmetic elements B1j are exclusively operated to generate outputs (to be described later).

The output element B40 outputs a value j corresponding to each first intermediate layer arithmetic element B1j.

The second intermediate layer arithmetic element B20 calculates a sum $X_j$ of outputs from the first intermediate layer arithmetic elements B1j and time-serially outputs the arithmetic operation result of an input/output characteristic for the sum $X_j$.

The output element B30 calculates a sum of (2n+1) outputs time-serially output from the second intermediate layer arithmetic element B20 and outputs the sum.

The multipliers multiply weighting coefficients $w_i$ with the outputs from the first intermediate layer arithmetic elements B1j. In this embodiment, the weighting coefficients are determined in accordance with the input positions (input terminals) of the inputs $x_i$ associated with the outputs from the first intermediate layer arithmetic elements B1j.

The operation of the arithmetic element coupling network in FIG. 3 will be described below. For j=0, the first intermediate layer arithmetic element B10 outputs $\phi(x_i+\epsilon \cdot j)$ (j=0, i.e., $\phi(x_i)$). The respective multipliers (not shown) multiply the weighting coefficients $w_i$ with the outputs from the first intermediate layer arithmetic element B10 to output values $w_i \cdot \phi(x_i+\epsilon \cdot j)$ (j=0, i.e., $w_i \cdot \phi(x_i)$) to the second intermediate layer arithmetic element B20. On the other hand, in synchronism with the above operation, the output element B40 outputs output values j to the second intermediate layer arithmetic element B20.

The second intermediate layer arithmetic element B20 calculates the sum X to obtain $\chi$ (X), which is then output to the output element B30.

The above operations are repeated for j=1 to 2n as in j=0.

The 2n+1 outputs respectively corresponding to j=0 to 2n are time-divisionally (2n+1 times) input from the second intermediate layer arithmetic element B20 to the output element B30. The output element B30 adds all the inputs and outputs the sum.

The resultant output value is exactly equal to that in FIG. 1. The arrangement of the second embodiment can effectively reduce the number of arithmetic elements. In comparison between the arrangement in FIG. 1 and that of the second embodiment, while the desired input/output relationship of the arithmetic element coupling network is kept unchanged, the number of first intermediate layer arithmetic elements can be reduced from n·(2n+1) to 2n+1, and the number of second intermediate layer arithmetic elements can be reduced from 2n+1 to one. In addition, the number of multipliers required as n·(2n+1) in number to multiply the weighting coefficient values with the outputs from the first intermediate layer arithmetic elements can be reduced to n. When each first intermediate layer arithmetic element B1j time-serially outputs n output values, and the multipliers are also time-divisionally operated such that $w_i$ is raised to the ith power of a predetermined value (e.g., $\lambda^i$), the multipliers can be further reduced to one.

In addition, the arithmetic elements used in the second embodiment perform identical arithmetic operations, so that these elements can be realized by a very simple circuit.

This embodiment has exemplified the case wherein the present invention is applied to the arithmetic element coupling network in FIG. 1. However, the present invention can be equally applied to other general arithmetic element coupling networks.

Figure 4:
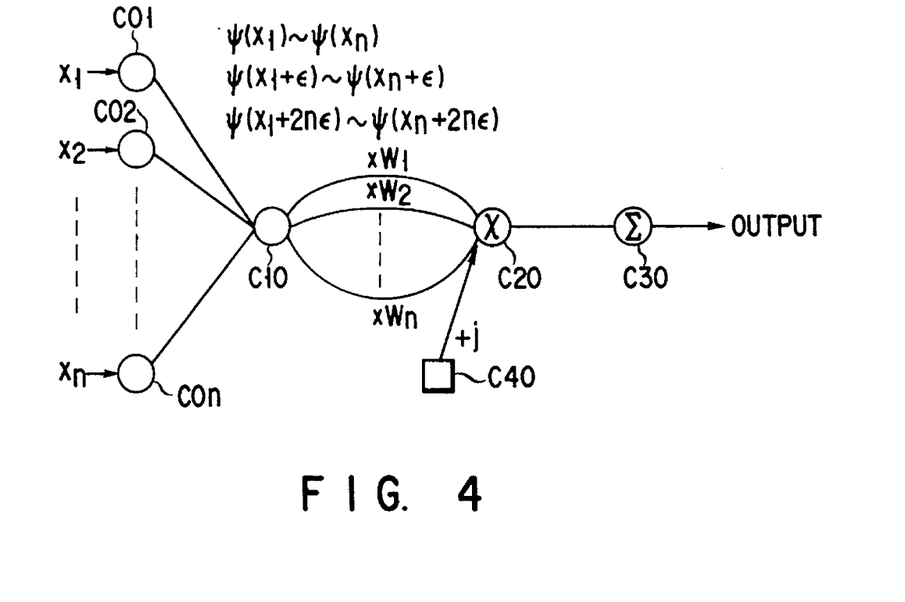
FIG. 4 is a view showing the arrangement of an arithmetic element coupling network according to the third embodiment of the present invention.

An arithmetic element coupling network according to the third embodiment of the present invention will be described below. FIG. 4 is a view showing the arithmetic element coupling network according to the third embodiment. This arithmetic element coupling network comprises input elements C01 to C0n, a first intermediate layer arithmetic element C10, multipliers (not shown), a second intermediate layer arithmetic element C20, an output element C30, and an output element C40.

The input elements C01 to C0n directly output input signals $x_1$ to $x_n$.

The first intermediate layer arithmetic element C10 sequentially outputs n·(2n+1) output values $\phi(x_i+\epsilon \cdot j)$ (j=1 to n, j=0 to 2n) for input signals $x_1$ to $x_n$ from the input elements C01 to C0n from smaller numbers j such that outputs of i=1 to n serve as one set (n outputs). The outputs constituting one set (n outputs) for i=1 to n may be simultaneously, parallelly output, or sequentially, time-serially output.

The output element C40 outputs the j values to the second intermediate layer arithmetic element C20 simultaneously when the first intermediate layer arithmetic element C10 outputs the weighting coefficients multiplied with the n outputs corresponding to the outputs j by the multipliers.

For every jth output, the second intermediate layer arithmetic element C20 calculates a sum X between the outputs from the output element C40 and the values obtained by multiplying the weighting coefficients with the n outputs from the first intermediate layer arithmetic element C10 to calculate an input/output characteristic $\chi(X)$, which is then output.

The output element C30 adds all the 2n+1 outputs sequentially input every jth output from the second intermediate layer arithmetic element C20, and then outputs the sum.

The multipliers multiply the weighting coefficients $w_i$ with the outputs from the first intermediate layer arithmetic element C10. In the third embodiment, the weighting coefficients are determined in accordance with the input positions (input terminals) of the inputs $x_i$ (i=1 to n) associated with the outputs from the first intermediate layer arithmetic element C10.

The operation of the arithmetic element coupling network in FIG. 4 will be described below.

For j=0, the first intermediate layer arithmetic element C10 outputs $\phi(x_i+\epsilon \cdot j)$ (i=1 to n, j=0; $\phi(x_i)$). The multipliers multiply the weighting coefficients $w_i$ with the outputs from the first intermediate layer arithmetic element C10 to output $w_i \cdot \phi(x_i+\cdot j)$ (j=0, $w_i \cdot \phi(x_i)$) to the second intermediate layer arithmetic element C20. At this time, the output value j from the output element C40 are output to the second intermediate layer arithmetic element C20.

The second intermediate layer arithmetic element 20 obtains a sum X of all the input signals to calculate $\chi(X)$, which is then output to the output element C30.

The above operations are sequentially repeated for j=1 to 2n as in j=0.

Outputs for j=0 to 2n from the second intermediate layer arithmetic element B20 are time-divisionally (2n+1 times) input to the output element 30. The output element 30 adds these inputs and outputs the sum.

The resultant output value is exactly equal to that in FIG. 1. With the arrangement of the third embodiment, the number of arithmetic elements can be effectively reduced. In comparison between the arrangement of FIG. 1 and that of the third embodiment, when the desired input/output relationship of the arithmetic element coupling network is kept unchanged, the number of first intermediate layer arithmetic elements can be reduced from n·(2n+1) to one, and the number of second intermediate layer arithmetic elements can be reduced from 2n+1 to one. In addition, the number of multipliers required as n·(2n+1) in number to multiply the weighting coefficient values with the outputs from the first intermediate layer arithmetic element can be reduced to n. When the first intermediate layer arithmetic element C10 time-serially outputs n outputs constituting one set output every time phase j, the multipliers can be time-divisionally operated as in the second embodiment, thereby further reducing the number of multipliers to one.

The input elements C01 to C0n (FIG. 4) described in contrast to FIG. 1 directly output the input signals, they are omitted in practice as in the first embodiment.

This embodiment has exemplified the case wherein the present invention is applied to the arithmetic element coupling network in FIG. 1. However, the present invention can be equally applied to a general arithmetic element coupling network.

Figure 5:
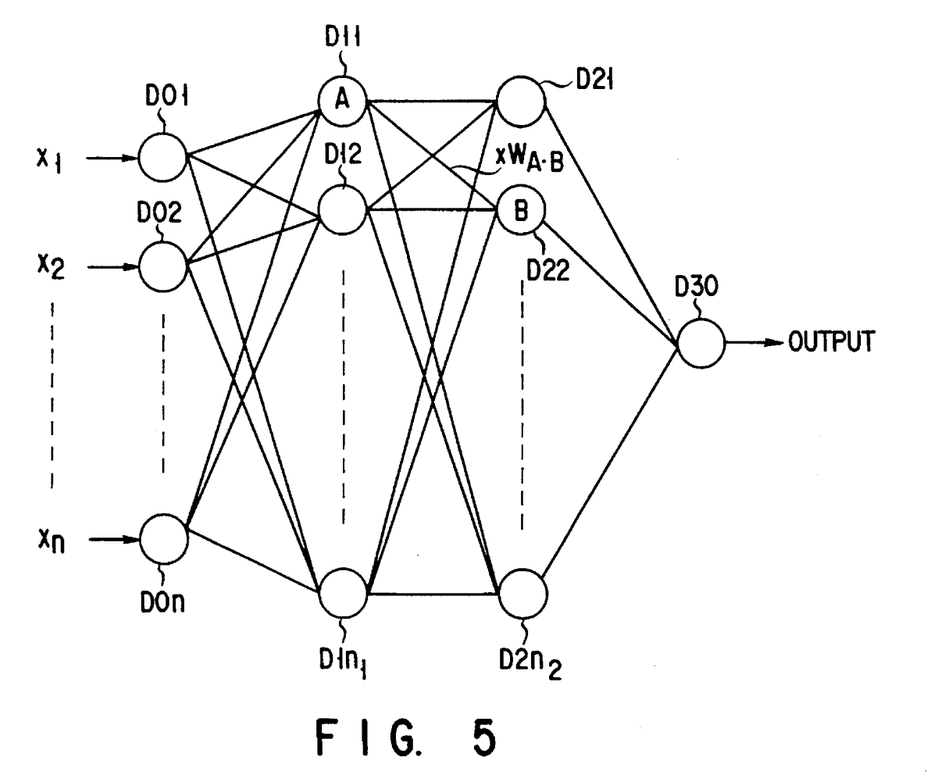
FIG. 5 is a view showing the arrangement of an arithmetic element coupling network according to the fourth embodiment of the present invention.

An arithmetic element coupling network according to the fourth embodiment of the present invention will be described below. FIG. 5 is a view showing the arithmetic element coupling network according to the fourth embodiment. This arithmetic operation element coupling network comprises input elements D01 to D0n, first intermediate layer arithmetic elements D11 to D1$n_1$, second intermediate layer arithmetic elements D21 to D2$n_2$, an output element D30, $(n \cdot n_1 + n_1 \cdot n_2 + n_2)$ multipliers (not shown) for multiplying weighting coefficients with outputs from the elements connected to the inputs thereof, and a weighting coefficient generating means (not shown). The fourth embodiment is constituted by a general arithmetic element coupling network except for the weighting coefficient generating means.

The weighting coefficient generating means generates weighting coefficients using a predetermined function having a smaller number of parameters than the total number of weighting coefficients (i.e., the total number of multipliers) included in the arithmetic element coupling network. For example, the weighting coefficients of two arithmetic elements A and B in FIG. 5 are generated using parameters inherent to these two arithmetic elements and a function having parameters whose number is smaller than the total number of weighting coefficients.

More specifically, $w_{A,B}$ can be expressed as follows:

$$w_{A,B} = \alpha \cdot n_{A,B} + \beta$$

or $$w_{A,B} = \delta \cdot n_{A,B} \gamma + \zeta$$

In the above equations, $n_{A,B}$ is a parameter inherent to the combination of the two arithmetic elements A and B, and $\alpha$, $\beta$, $\gamma$, $\delta$, and $\zeta$ are arithmetic element coupling network parameters to be learned.

In this case, in learning, the network learns the parameters $\alpha$, $\beta$, $\gamma$, $\delta$ and $\zeta$ in place of learning the weighting coefficients, and the weighting coefficient generating means generates the weighting coefficients using these parameters.

As described above, predetermined limitations are imposed on the weighting coefficients, and the weighting coefficient generating means is arranged to reduce the memory capacity for holding parameters necessary for the weighting coefficients and the number of signal lines for changing the weighting coefficient values during learning.

As described above, according to the fourth embodiment, a great reduction in calculation amount for changes during learning can be expected because the number of parameters to be learned can be greatly reduced. Therefore, high-speed learning can be performed.

An arithmetic element coupling network according to the fifth embodiment of the present invention will be described below. The arithmetic element coupling network of this embodiment is obtained by simply adding a weighting coefficient generating means (to be described later) to the arithmetic element coupling network in FIG. 1, and its illustration is omitted for the descriptive convenience. The arrangement and operation of the arithmetic element coupling network of the fifth embodiment are the same as those in FIG. 1 except for the weighting coefficient generating means, and a detailed description thereof will be omitted for the sake of simplicity.

The weighting coefficient generating means generates all weighting coefficients using a predetermined function having a smaller number of parameters than the total number of weighting coefficients included in the arithmetic element coupling network of the fifth embodiment.

In learning, as in the fourth embodiment, the parameters are learned in place of the weighting coefficients themselves. The weighting coefficient generating means generates the weighting coefficients using these parameters.

In the above arithmetic element coupling network configuration, if all the weighting coefficients from the first intermediate layer arithmetic elements P1i-j to the second intermediate layer arithmetic element P2j are values raised to powers of one parameter $\lambda$ (i.e., $\lambda^i$), the weighting coefficients from the input elements P01 to P0n to the first intermediate layer arithmetic elements P1i-j and the weighting coefficients from the second layer arithmetic elements P2j to the output element P30 are 1, the number of memories required for indirectly holding all the weighting coefficient values and the number of signals for changing the values during learning can be reduced to one each.

In this case, even if memories are prepared for all the values raised to the powers of the parameter $\lambda$ to directly hold the weighting coefficient values, the maximum number of memories is n.

The (2n+1) weighting coefficient values from the first intermediate layer arithmetic elements P1i-j to the second intermediate layer arithmetic elements P2j are values $\lambda^i$ of the same modulus. The multipliers for calculating the outputs from the first intermediate layer arithmetic elements and the corresponding weighting coefficients can be constituted by n multipliers corresponding to $\lambda^1$ to $\lambda^n$.

According to the fifth embodiment, the number of parameters to be learned can be greatly reduced, and a great reduction in calculation amount of changes during learning can be expected. Therefore, high-speed learning can be performed.

when the parameter $\lambda$ expressing the weighting coefficient from the first intermediate layer arithmetic element to the second intermediate layer arithmetic element is very close to one, relation $\lambda = 1 + \alpha (\alpha \ll 1)$ is established, and the parameters can be approximated to $\lambda^i = 1 + i \cdot \alpha$. To directly or indirectly hold all the weighting coefficients, a memory for storing $\alpha$ or one to n multiples of $\alpha$ is required, thereby expecting the same effect as described above. In addition, the precision of the memory can be degraded.

An arithmetic element coupling network according to the sixth embodiment of the present invention will be described below. In the arithmetic element coupling network of the sixth embodiment, each arithmetic element constituting the arithmetic element coupling network in FIG. 1 can be constituted by a plurality of arithmetic elements. If the arithmetic element constituted by the plurality of arithmetic elements serves as one arithmetic element of one higher level, the higher levels of the hierarchical structure of the arithmetic element coupling network of the present invention have the same structure as in FIG. 1.

All the outputs from the second intermediate layer arithmetic elements P2j in FIG. 1 are directly transmitted to the output element P30, and the output element P30 calculates and outputs their sum. A final output signal through the above processes can be expressed by expression (2) for the input signals $x_1$ to $x_n$:

$$\sum_{j=0}^{2n} \chi \left[ \sum_{i=1}^{n} \lambda^i \phi(x_i + \epsilon \cdot j) + 1 \right] \quad (2)$$

where $\chi$ is the continuous function, $\phi$ is the monotone increasing continuous function, $\lambda$ is the real constant, and $\lambda$ is the positive constant.

To approximate a specific multi-input, one-output relationship in the arithmetic element coupling network in FIG. 1 in accordance with learning using the steepest descent method, learning parameters must be determined for the continuous function $\chi$ and the monotone increasing continuous function $\phi$. In the sixth embodiment, the above two functions are approximated by equations (3) and (4) and the weighted linear sum of a predetermined one-variable function obtained by shifting and scaling variables:

$$\phi(x) \approx \sum_{i=1}^{N} c_i \cdot \phi(a_i x + b_i) \quad (3)$$

$$\chi(z) \approx \sum_{i=1}^{N} g_i \cdot \phi(e_i z + f_i) \quad (4)$$

where $a_1$ to $a_N$ (for scaling), $b_1$ to $b_N$ (for shifting), $c_1$ to $c_N$ (weighting coefficient), $e_1$ to $e_M$ (for scaling), $f_1$ to $f_M$ (for shifting), and $g_1$ to $g_M$ (weighting coefficients) are parameters for adjusting the input/output relationships of arithmetic elements E100 and F200.

The predetermined one-variable function preferably comprises, e.g., a sigmoid function $(1 + \exp(-x))^{-1}$ or a Gaussian function $\exp(-x^2)$.

Figure 6:
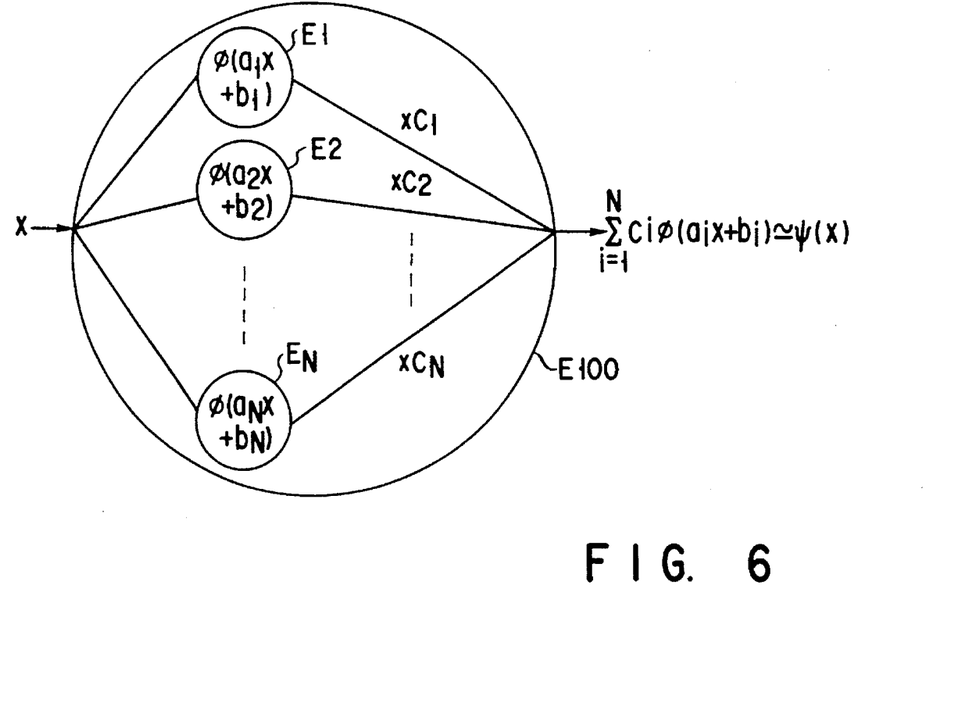
FIG. 6 is a view showing an arithmetic element having a hierarchical structure according to the sixth embodiment of the present invention.
Figure 7:
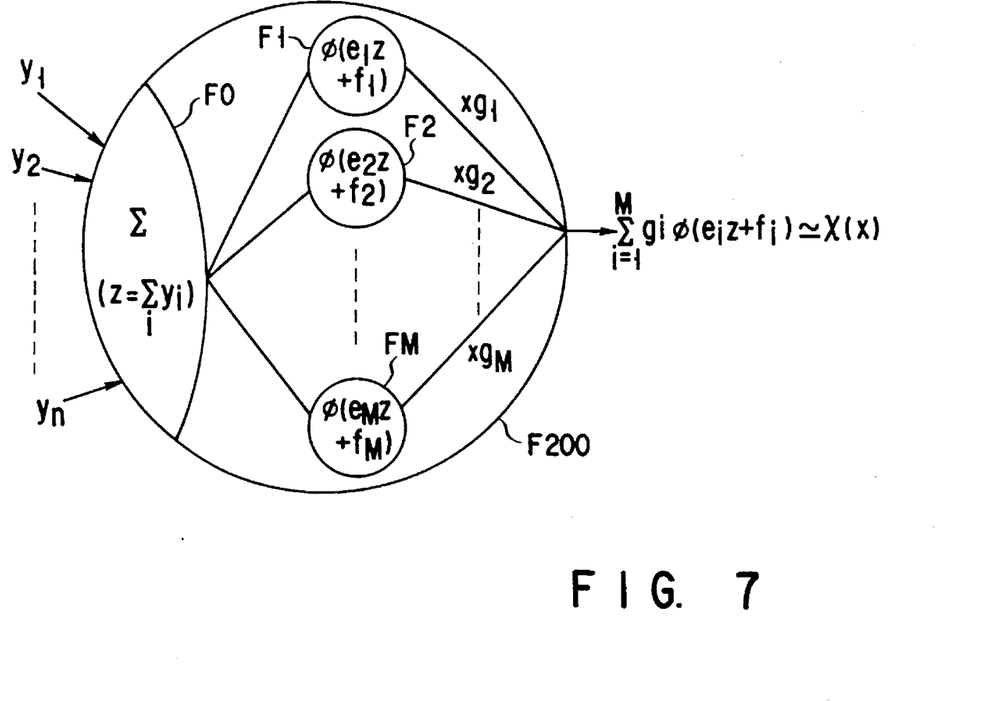
FIG. 7 is a view showing another arithmetic element having a hierarchical structure according to the sixth embodiment of the present invention.

The detailed arrangements of the arithmetic element having the above input/output relationship are shown in FIGS. 6 and 7.

An arithmetic element coupling network E100 (FIG. 6) constituting one first intermediate layer arithmetic element comprises N arithmetic elements Ei (i=1 to N) for executing $\phi(a_i x + b_i)$, multipliers (not shown), respectively connected to the outputs of the N arithmetic elements Ei, for multiplying $C_i$ with the outputs from the arithmetic elements Ei, and an output element (not shown) for adding the outputs from the multipliers and outputting the sum.

An arithmetic element coupling network F200 (FIG. 7) constituting one second intermediate layer arithmetic element comprises an input element F0 for outputting a sum total z of inputs $Y_i$, M arithmetic elements Fi (i=1 to M) for executing $\phi(e_i z+f_i)$, multipliers (not shown), respectively connected to the outputs of the M arithmetic elements Fi, for multiplying $g_i$ with the outputs from the arithmetic elements Fi, and an output element (not shown), respectively connected to the outputs of the multipliers, for calculating and outputting the sum of the outputs from the multipliers.

The first and second arithmetic elements which determine the input/output characteristics of the functions $\chi$ and $\phi$ are approximated by the weighted linear sums of N and M one-input, one-output arithmetic elements corresponding to the linear sums of the functions $\chi$ and $\phi$, as shown in FIGS. 6 and 7. The degrees of freedom of the functions inherently having infinite degrees of freedom can be limited to 3·N and 3·M finite values, respectively.

In the above arithmetic element coupling network, the number of parameters each having a degree of freedom is limited to the finite number (3·N+3·M+2) in both the real constant $\lambda$ and the positive constant $\epsilon$. A learning algorithm such as the steepest descent method can be applied to this arithmetic element coupling network. When the input/output characteristics of the arithmetic elements constituting the hierarchical structure and the number of input/output characteristics are properly selected, approximation learning of the given multi-variable function can be performed.

N and M can be selected to be small depending on the given multi-variable function and the required approximation precision. The number of parameters used in the entire arithmetic element coupling network can be reduced.

According to the sixth embodiment, the intermediate layer arithmetic elements used in the entire arithmetic element coupling network can be constituted by identical elements, thus obtaining a hardware advantage.

Some or all of the arithmetic elements E1 to EN (FIG. 6) and the arithmetic elements F1 to FM (FIG. 7), all of which have the above hierarchical structure, can be hierarchically constituted by the weighted linear sum of identical arithmetic elements having the same type as described above or the coupling network of identical arithmetic elements having the same type as described above. Adaptability of the input/output relationship expression capability of the intermediate layer arithmetic elements can be improved, and the function approximation capability of the arithmetic element coupling network as a whole may be increased.

An arithmetic element coupling network according to the seventh embodiment of the present invention will be described below.

To constitute one (higher level) arithmetic element as in the arithmetic element E100 (FIG. 6) or the arithmetic element F200 (FIG. 7), a hierarchical structure using a plurality of arithmetic elements (lower-level arithmetic elements) can be applied to any other general arithmetic element coupling network. In the sixth embodiment, the one-input, one-output arithmetic element is used to constitute a higher-level arithmetic element. However, the seventh embodiment exemplifies a general arithmetic element coupling network using multi-input, one-output arithmetic elements.

Figure 8:
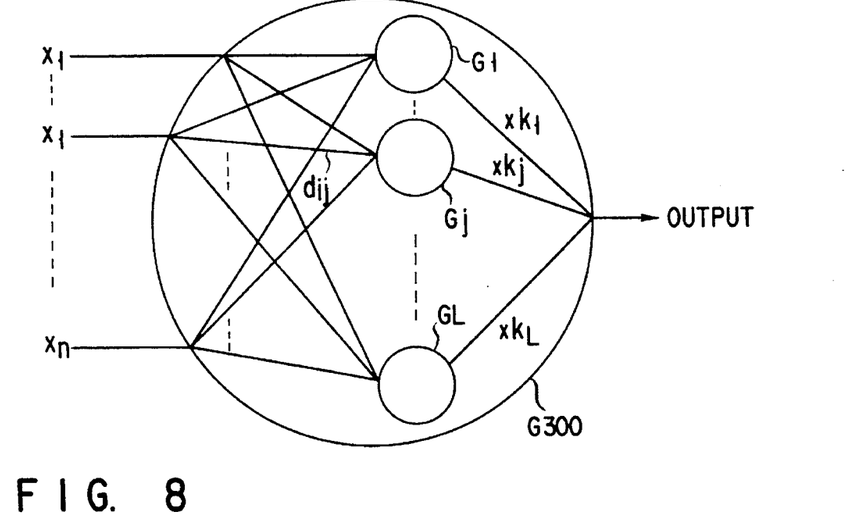
FIG. 8 is a view showing the arrangement of an arithmetic element coupling network according to the seventh embodiment of the present invention.

An arithmetic element G300 constituting one (upper level) arithmetic element comprises L arithmetic elements Gj (j=1 to L) for executing $f(u_1+h_{1j}, u_2+h_{2j}, \ldots, u_n+h_{nj})$ where $u_i$ (i=1 to n) is an input, multipliers (not shown) for multiplying weighting coefficients $d_{ij}$ with the inputs $x_i$ (i= 1 to n), multipliers (not shown), respectively connected to the outputs of the L arithmetic elements Gj, for multiplying $k_j$ with the outputs from the arithmetic elements Gj, and an output element (not shown) for adding the outputs from these multipliers and outputting the sum. In this embodiment, $h_{ij}$ (i=1 to n) represents a constant set.

The arithmetic element G300 has the input/output characteristic represented by relation (5) below:

$$\sum_{j=1}^{L} k_j \cdot f(d_{1j}x_1 + h_{1j}, d_{2j}x_2 + h_{2j}, \ldots, d_{ij}x_i + h_{ij}, \ldots, d_{nj}x_n + h_{nj}) \quad (5)$$

When an arithmetic element coupling network is constituted using the arithmetic element G300, and weighting coefficients $d_{ij}$ and $k_j$ and the constant set $h_{ij}$ between the arithmetic elements constituting the hierarchical structure of the arithmetic element G300 are regarded as some of the parameters in the entire arithmetic element coupling network, the learning algorithm such as the steepest descent method can be applied as in the conventional case. A desired input/output function can be learned and approximated.

A plurality of arithmetic elements having input/output characteristics which can be easily realized as hardware are coupled to constitute an arithmetic element coupling network. Identical nonlinear elements are aligned and stacked like a conventional laminar arithmetic element coupling network to obtain an arithmetic element coupling network, and this network is used to be expected to increase the learning speed and the approximation capability. This also applies to the arithmetic element E100 in FIG. 6 and the arithmetic element F200 in FIG. 7.

An arithmetic element coupling network according to the eighth embodiment of the present invention will be described below.

The arithmetic element in FIG. 6, 7, or 8 is constituted by weighted linear coupling of one-input, one-output elements or multi-input, one-output elements. However, according to the eighth embodiment, each higher-level arithmetic element is obtained by arbitrarily coupling the multi-input, one-output arithmetic elements and the one-input, one-output arithmetic elements. Between the coupled arithmetic elements, network coupling of the arithmetic elements is utilized such that a value obtained by multiplying a predetermined weighting coefficient with an output value from one element serves as an input signal to the other element, thereby constituting a hierarchical structure.

Figure 9:
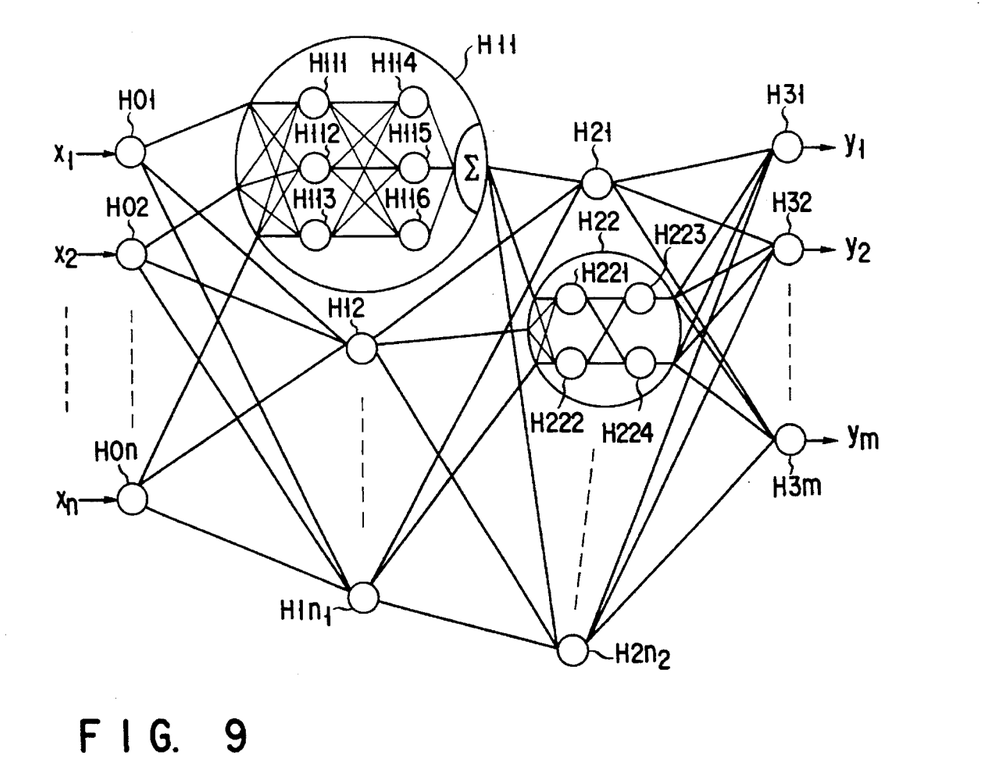
FIG. 9 is a view showing the arrangement of an arithmetic element coupling network according to the eighth embodiment of the present invention.

FIG. 9 is a view showing an arithmetic element coupling network using these arithmetic elements according to the eighth embodiment.

An n-input, m-output laminar arithmetic element coupling network comprises input elements H01 to H0n, first intermediate layer arithmetic elements H11 to H1n$_1$, second intermediate layer arithmetic elements H21 to H1n$_2$, and output elements H31 to H3m.

The first intermediate layer arithmetic element H11 serving as an n-input, one-output element comprises lower-level arithmetic elements H111 to H116. The second intermediate layer arithmetic element H22 serving as an n1-input, 2-output element has lower-level arithmetic elements H221 to H224. In this embodiment, the remaining first intermediate layer arithmetic elements H12 to H1n$_1$, the remaining second intermediate layer arithmetic elements H21 and H23 to H2n$_2$, and the arithmetic elements H111 to H116 and H221 to H224 are lowest-level arithmetic elements which do not have a lower level.

The arithmetic elements H111 to H116 and H221 to H224 constituting the above hierarchical structure are constituted by elements having the same structure as that of the remaining intermediate layer arithmetic elements H12 to H1n$_1$, H21, and H23 to H2n$_2$, e.g., elements each having an input/output characteristic of a bounded, monotone sigmoid function.

When the weighting coefficients between the arithmetic elements of the arithmetic element coupling network constituting the hierarchical structure of the intermediate layer arithmetic elements H11 and H22 are regarded as some of the parameters of the entire arithmetic element coupling network in FIG. 9, the learning algorithm such as the steepest descent method can be applied as in the conventional case, and a desired input/output function can be learned and approximated.

Although only identical arithmetic elements are present in the entire arithmetic element coupling network as in the conventional case, the input/output characteristics of the intermediate layer arithmetic elements H11 and H22 are generally different from those of the remaining intermediate layer arithmetic elements. Depending on an input/output relationship to be expressed by the entire arithmetic element coupling network in FIG. 9, the learning speed and the approximation capability can be increased by an arithmetic element coupling network in which identical nonlinear elements are arranged and stacked as in the conventional laminar arithmetic element coupling network.

Some or all of the arithmetic elements H111 to H116 and H221 to H224 constituting the hierarchical structure are hierarchically arranged by an arithmetic element coupling network constituted by elements having the same input/output characteristic as or different input/output characteristic from the above elements. Adaptability of the input/output relationship expression capability of the intermediate layer arithmetic elements H11 and H22 can be further improved, thereby improving the function approximation capability of the entire arithmetic element coupling network.

When only identical arithmetic elements are used in an entire arithmetic element coupling network as in the eighth embodiment, this arrangement is very advantageous from the viewpoint of hardware.

According to the eighth embodiment, when a conventional arithmetic element is to have a hierarchical structure to cause learning of the input/output characteristic of the arithmetic element, the number of parameters to be learned can be limited, and the input/output characteristic of the arithmetic operation element can be flexibly changed. The eighth embodiment is also applicable to another arithmetic element coupling network such as a recurrent neural network.

The present invention has been described with reference to the preferred embodiments. The present invention is not limited to the particular embodiments described above. Various changes and modifications may be made without departing the spirit and scope of the invention.

Additional advantages and modifications will readily occur to those skilled in the art. Therefore, the present invention in its broader aspects is not limited to the specific details, representative devices, and illustrated examples shown and described herein. Accordingly, various modifications may be made without departing from the spirit or scope of the general inventive concept as defined by the appended claims and their equivalents.

What is claimed is:

1. An arithmetic element coupling network for inputting at least one signal to obtain a desired output, comprising:

a plurality of arithmetic elements including at least one of a first arithmetic element for receiving one signal and time-divisionally performing different types of first arithmetic operations of said one signal, a second arithmetic element for sequentially receiving a plurality of signals and time-divisionally performing identical second arithmetic operations of the plurality of signals, and a third arithmetic element for sequentially receiving a plurality of signals and time-divisionally performing different types of third arithmetic operations of each of the plurality of signals; and weighting means for arbitrarily coupling said plurality of arithmetic elements and supplying a value multiplying a predetermined weight coefficient with one of output values from two arithmetic elements coupled to each other to the other arithmetic element.

2. A network according to claim 1, further comprising a fourth arithmetic element for calculating a sum of outputs serially output from at least one of said first to third arithmetic elements.

3. A network according to claim 1, wherein said first arithmetic element includes a plurality of arithmetic elements and supplies an output to one arithmetic element for performing a predetermined arithmetic operation, and said weighting means includes means for multiplying a weighting coefficient corresponding to an output from each of said first arithmetic elements.

4. A network according to claim 1, wherein said first arithmetic element includes means for receiving a value obtained by adding a predetermined value as an offset value which is an arbitrary integer multiple of the input and for performing a predetermined arithmetic operation while the offset value is changed.

5. A network according to claim 1, further comprising:

a fifth arithmetic element for outputting a predetermined signal to said second arithmetic element, and wherein said second arithmetic element includes a plurality of arithmetic elements and supplies an output to one arithmetic element for performing a predetermined arithmetic operation, and said weighting means includes means for multiplying a weighting coefficient corresponding to said fifth arithmetic element with an output from said second arithmetic element.

6. A network according to claim 1, further comprising:

a fifth arithmetic element for outputting a predetermined signal to said third arithmetic element, and wherein said third arithmetic element supplies an output to one arithmetic element for performing a predetermined arithmetic operation, and said weighting means includes means for multiplying a weighting coefficient corresponding to said fifth arithmetic element with an output from said third arithmetic operation element.

7. A network according to claim 1, wherein said third arithmetic element includes means for receiving a value obtained by adding a predetermined value as an offset value which is an arbitrary integer multiple of the input and for performing a predetermined arithmetic operation while the offset value is changed.

8. A network according to claim 1, wherein said weighting means has a predetermined function of calculating weighting coefficients in accordance with parameters smaller in number than the weighting coefficients.

9. An arithmetic element coupling network including a plurality of arithmetic elements for performing at least one predetermined arithmetic operation of at least one input signal and outputting at least one output signal, and means for arbitrarily coupling said plurality of arithmetic elements and supplying a value multiplying a predetermined weight coefficient with one of output values from two arithmetic elements coupled to each other to the other arithmetic element, wherein at least one of said plurality of arithmetic elements includes at least one unit arithmetic element selected from a plurality of multi-input, one-output arithmetic elements which are weighted and linearly coupled, a plurality of one-input, one-output arithmetic elements which are weighted and linearly coupled, and a plurality of one-input, multi-output arithmetic elements which are weighted and linearly coupled.

10. A network according to claim 9, wherein said arithmetic element has a hierarchical structure having said unit arithmetic element as a lowest-level element.

11. A network according to claim 9, wherein said unit arithmetic element includes a given function of performing an arithmetic operation using one of a multi-variable function having a plurality of variables and new variables obtained such that constants are respectively added to the plurality of variables, and resultant sums are linearly converted, and a one-variable function having one variable and a new variable obtained such that a constant is added to the variable, and a resultant sum is multiplied with a constant, the given function converting an arithmetic result into a function identical to the predetermined function.

12. A network according to claim 11, wherein the one-variable function includes a function represented by exponential function.

13. An arithmetic element coupling network for inputting at least one signal and obtaining a desired output, comprising:

a first process layer having a plurality of arithmetic elements including at least one of a first arithmetic element for receiving one signal and time-divisionally performing different types of first arithmetic operations of said one signal, a second arithmetic element for sequentially receiving a plurality of signals and time-divisionally performing identical second arithmetic operations of the plurality of signals, and a third arithmetic element for sequentially receiving a plurality of signals and time-divisionally performing different types of third arithmetic operations of each of the plurality of signals, said first process layer multiplying an input signal with a predetermined weighting coefficient and outputting a product;

a second process layer having an arithmetic element for receiving an output from said first process layer, calculating a sum of the outputs for a predetermined arithmetic element, and performing a predetermined arithmetic operation; and a third process layer having an arithmetic element for obtaining a sum of a predetermined number of outputs from said second process layer.

14. A network according to claim 13, further comprising a fourth process layer having a plurality of arithmetic elements for receiving one signal outside said arithmetic element coupling network and outputting at least one signal directly to said first process layer.

15. A network according to claim 13, wherein said first arithmetic element includes a plurality of arithmetic elements and supplies an output to one arithmetic element for performing a predetermined arithmetic operation, and said weighting means includes means for multiplying a weighting coefficient corresponding to an output from each of said first arithmetic elements.

16. A network according to claim 13, wherein said first arithmetic element includes means for receiving a value obtained by adding a predetermined value as an offset value which is an arbitrary integer multiple of the input and for performing a predetermined arithmetic operation while the offset value is changed.

17. A network according to claim 13, further comprising:

a fifth arithmetic element for outputting a predetermined signal to said second arithmetic element, and wherein said second arithmetic element includes a plurality of arithmetic elements and supplies an output to one arithmetic element for performing a predetermined arithmetic operation, and said weighting means includes means for multiplying a weighting coefficient corresponding to said fifth arithmetic element with an output from said second arithmetic element.

18. A network according to claim 13, further comprising:

a fifth arithmetic element for outputting a predetermined signal to said third arithmetic element, and wherein said third arithmetic element supplies an output to one arithmetic element for performing a predetermined arithmetic operation, and said weighting means includes means for multiplying a weighting coefficient corresponding to said fifth arithmetic element with an output from said third arithmetic element.

19. A network according to claim 13, wherein said third arithmetic element includes means for receiving a value obtained by adding a predetermined value as an offset value which is an arbitrary integer multiple of the input and for performing a predetermined arithmetic operation while the offset value is changed.

20. A network according to claim 13, wherein said weighting means has a predetermined function of calculating weighting coefficients in accordance with parameters smaller in number than the weighting coefficients.

* * * * *